United States Patent [19]

Kramer

[11] 4,012,583
[45] Mar. 15, 1977

[54] PAY TV CONTROL SYSTEM
[75] Inventor: Dennis A. Kramer, Des Plaines, Ill.
[73] Assignee: Motorola, Inc., Schaumburg, Ill.
[22] Filed: Mar. 3, 1975
[21] Appl. No.: 555,010
[52] U.S. Cl. .................................. 358/84; 70/263; 340/149 R
[51] Int. Cl.² ......................................... H04N 1/44
[58] Field of Search ..................... 178/5.1, DIG. 13; 340/149 R, 149 A; 70/263

[56] References Cited

UNITED STATES PATENTS

| | | | |
|---|---|---|---|
| 3,353,006 | 11/1967 | Pollock et al. | 340/149 A |
| 3,624,631 | 11/1971 | Chomet et al. | 340/280 |
| 3,694,810 | 9/1972 | Mullens | 340/149 R |
| 3,736,369 | 5/1973 | Vogelman et al. | 178/5.1 |
| 3,790,700 | 2/1974 | Callais et al. | 178/5.1 |
| 3,906,447 | 9/1975 | Crafton | 340/149 A |

Primary Examiner—Malcolm F. Hubler
Assistant Examiner—S. C. Buczinski
Attorney, Agent, or Firm—Victor Myer; James W. Gillman

[57] ABSTRACT

A simple recyclable key and locking system for enabling a pay TV converter is disclosed. The key is a small tag such as might be attached to the room key of a hotel room and is to be turned in with the room key. The TV viewing key is inserted into a locking-unlocking unit which determines its validity, makes the appropriate connection in a pay TV converter to enable viewing, then cancels the validity of the key. When turned in, the key is easily examined as to whether or not it has been used, and, if so, it can be quickly revalidated for reuse. The key user is billed only if his viewing key has been used, or is not returned. In a residential situation, the viewing key would be purchased, then discarded after one use.

10 Claims, 7 Drawing Figures

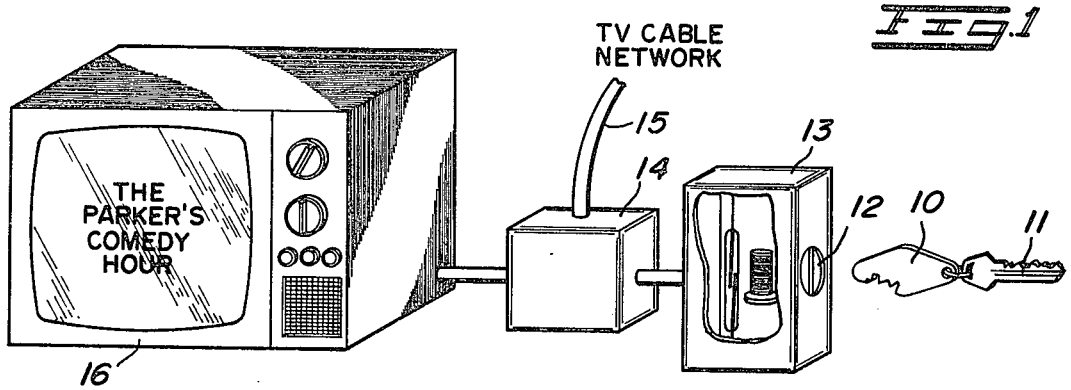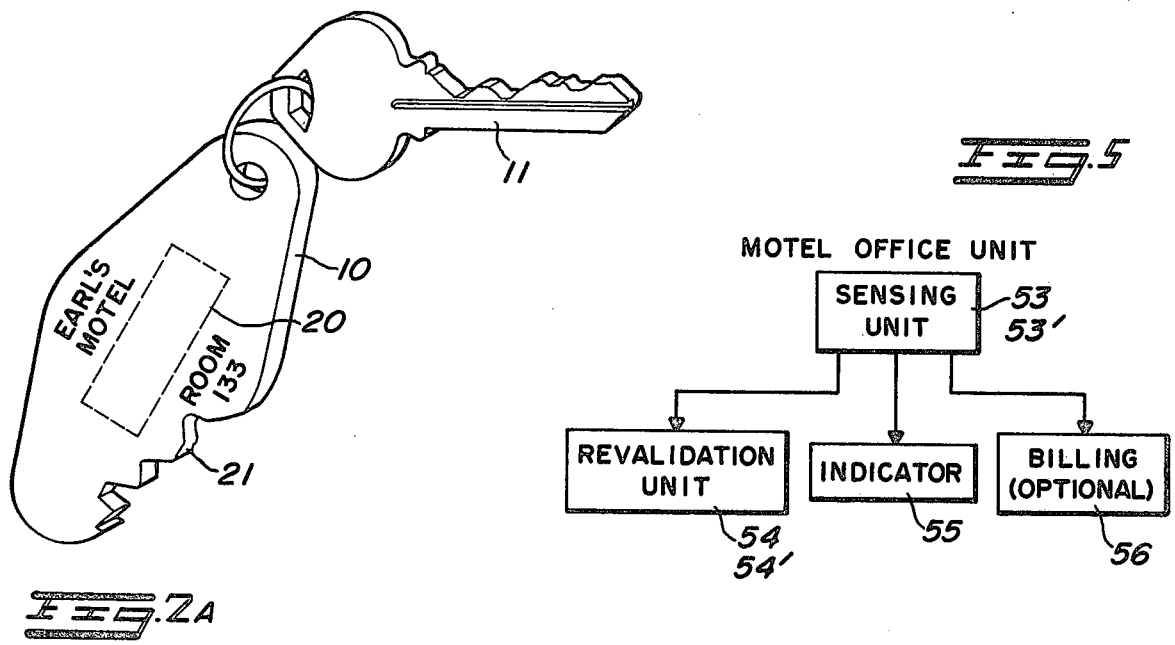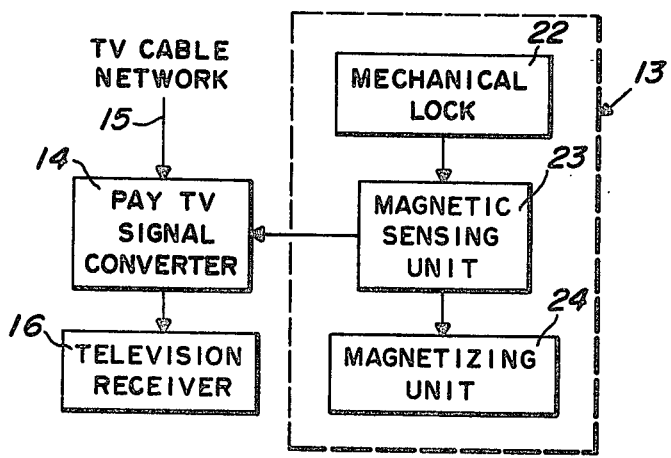

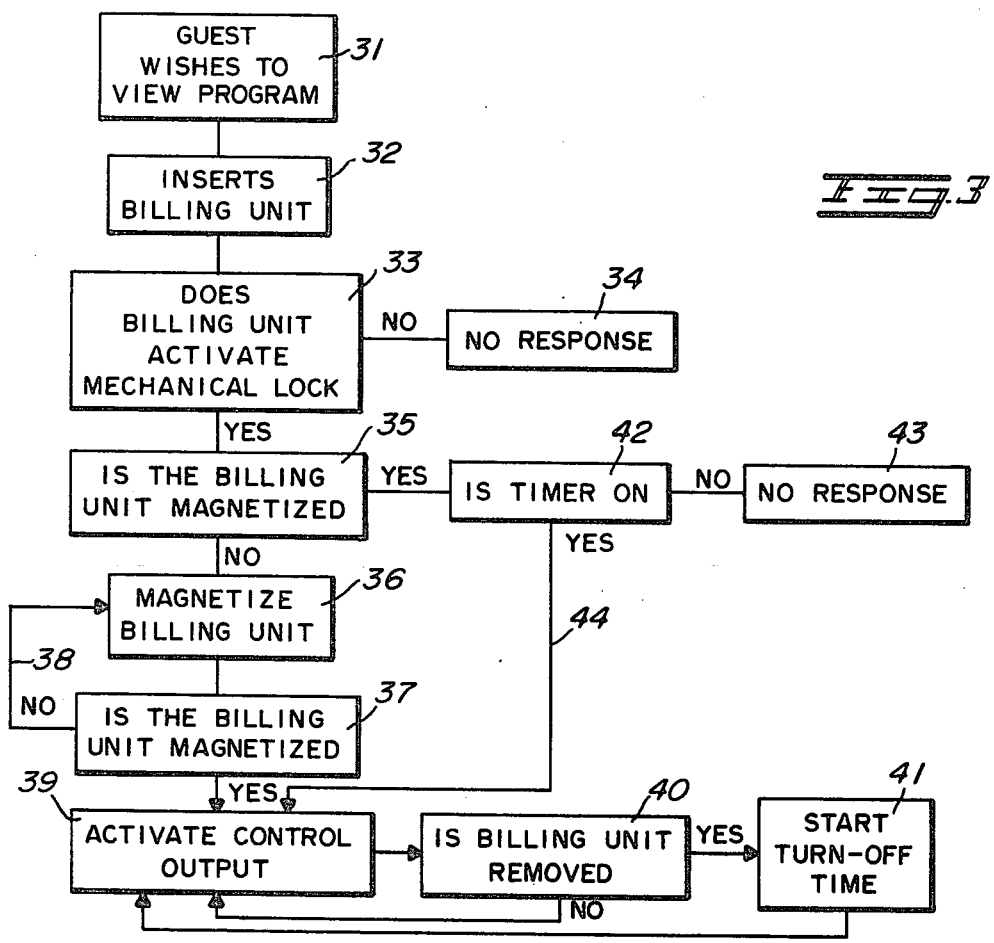
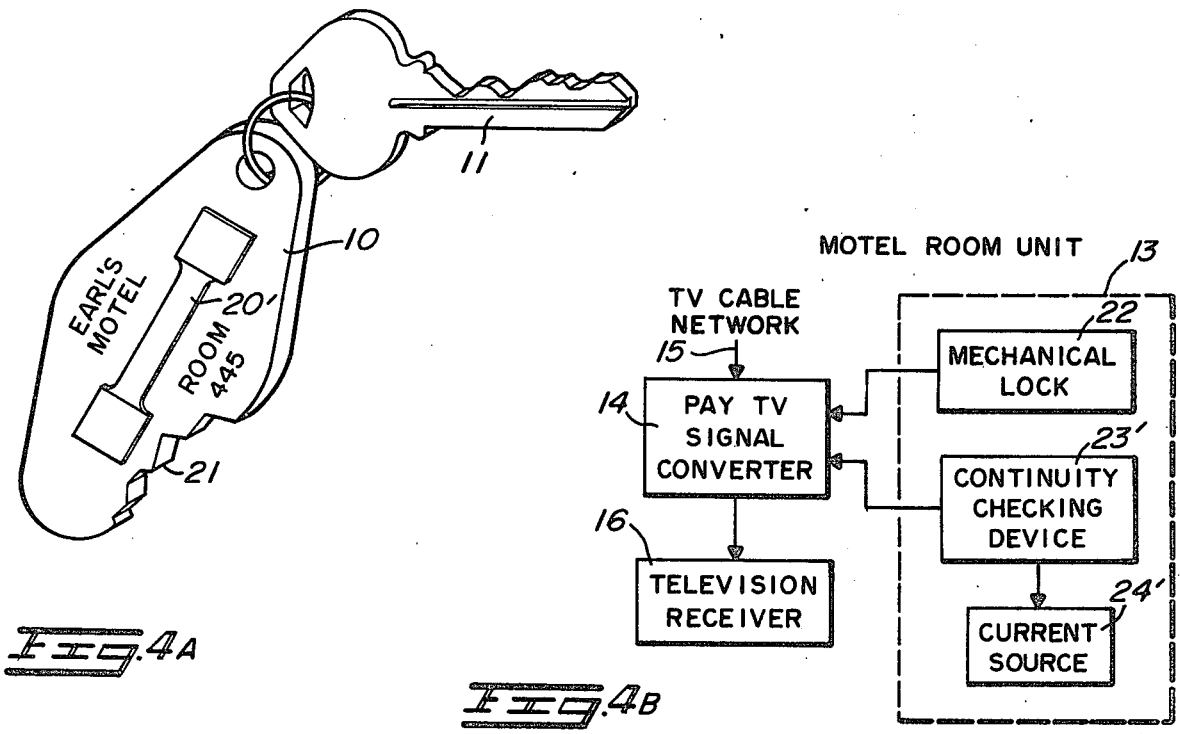

PAY TV CONTROL SYSTEM

BACKGROUND OF THE INVENTION

1. Field of the Invention

The present invention relates to television receiving systems wherein the user is charged for viewing special non-broadcast television programs, and more particularly to devices for enabling a TV set in a hotel/motel room, for example, whereafter such viewing, the use of the device is sensed and that information is used to determine the payment due.

2. Prior Art

There are many more or less complex systems for the control and sensing of viewing in the field of pay TV. A few of these are for the transient user but more are for the subscription user. Most systems require a two-way flow of data by wire or radio transmission plus a complicated billing procedure. Most systems use moving parts, requiring at least occasional adjustment or replacement. In the case of the transient viewer, such systems are neither practical nor economically feasible. Coin-operated enabling devices have been developed which do not require the two-way communication, but are not too satisfactory in view of the large number of coins required for watching most special programs. What is desired is a simple and economical way of activating the TV receiver in a transient room to allow viewing the special programs on otherwise unused channels, combined with a simple way of determining whether or not the receiver was so activated. This information can be used for billing and other purposes.

SUMMARY OF THE INVENTION

Therefore, it is a general object of the present invention to provide an improved device for enabling and recording use of such special channel and to allow for sensing and billing later.

It is a particular object of the invention to provide an improved, simple and inexpensive system requiring no moving parts and which includes a validation device to activate a TV receiver for such viewing.

It is a more particular object of the invention to provide an improved device which, when used to activate the receiver, will be invalidated for further use until its use has been sensed and the device revalidated.

In a typical hotel/motel situation, a master antenna and cable system provides all normal broadcast service to each questroom. In addition, it may be desired to provide special programming such as sporting events on otherwise unused channels. Since a charge is usually made for watching these programs, they are transmitted to the room in normally unintelligible form. A control mechanism, attached to the receiver in each room can make the extra channels intelligible when enabled by some activating device. This device may also be correlated in some way with the billing function.

Another use of the invention is in a residential situation, where a user might purchase viewing keys in any quantity desired, each such key to be used only once and then discarded.

In the present invention the "viewing key" is a key or tag somewhat similar to the tag normally attached to a room key. One portion of this viewing key has a mechanical configuration whereby it gains access to the TV receiver control mechanism. Another portion of the viewing key can be validated before it is given to a hotel guest. If the guest inserts the viewing key into the control mechanism to enable watching a desired special program, the control device; (1) determines the validity of the viewing key, (2) enables the viewer to watch the program on a special channel, and (3) invalidates the viewing key.

A timing device may be added to the above control device to allow guests one brief preview of a special program without charge. The timing device is then disabled for a given period such as an hour or half hour. Several such devices are known to the art.

When the guest checks out of the hotel/motel, and returns his room key, the attached viewing key is inserted into a validity sensing device where it is examined and revalidated if necessary. If the viewing key has been used or is not returned with the room key, the guest is billed for watching a program.

BRIEF DESCRIPTION OF THE DRAWING

FIG. 1 is a perspective view of the television receiving system according to the invention as it might be interconnected in a hotel/motel guestroom;

FIG. 2A shows a preferred embodiment of the viewing key;

FIG. 2B is a block diagram of a guestroom system in which the viewing key could be used;

FIG. 3 is a flowchart of the operation of the system according to a preferred embodiment;

FIGS. 4A and 4B show another embodiment of the viewing key with a block diagram of a guestroom system in which it could be used;

FIG. 5 is a block diagram of the hotel/motel office system.

DETAILED DESCRIPTION OF THE INVENTION

In FIG. 1 a pay TV viewing key 10, shown here attached to a room key 11, is inserted into a slot 12 in a pay TV activating unit 13 which is connected to a signal converter 14. In this embodiment, the unit 13 comprises a magnetic sensing device, a magnetizing device and appropriate switching and control circuits. The TV cable network 15 is also connected to the signal converter which converts out-of-band signals on the cable to channels in the band which are otherwise unused locally. The signal converter 14 is connected to a standard television receiver 16 at its antenna input (not shown).

In FIG. 2A a preferred embodiment of the viewing key 10 is shown in more detail. It should be noted that, although the viewing key 10 is shown in the drawing attached to the room key 11, this attachment is merely a convenience and is not essential to the present invention. The main body of the viewing key is of a nonmagnetic material. Included in the viewing key is a magnetizable area 20. A portion 21 of the perimeter of viewing key 10 is shaped to perform the same function as the teeth of a typical key. However, any physical configuration which would perform the unlocking function and which would be difficult to counterfeit would be suitable.

FIG. 2B shows the guestroom system which is activated by insertion of the viewing key 10 into the activating unit 13. If the viewing key operates the mechanical lock 22, as it will if it is authentic, that is, the key fits the lock, the magnetic sensing unit 23 then checks the validity of the key. In this embodiment the viewing key is valid when the magnetizable area 20 is not magnetized. Any magnetic sensing device may perform this sensing function. The area 20 is magnetized by a magnetizing unit 24 when the key is used to provide access to a special program, thus invalidating the key, that is, renders it useless until revalidated. It is obvious that reversing the conditions of validity and invalidity, along with the requisite system changes, would still fall within the scope of the invention. If the viewing key 10 is valid, i.e., not magnetized, when it is inserted into the slot 12 of the activating unit 13, unit 13 will enable the converter 14 and allow viewing of the special program. Then the magnetizing unit will magnetize (i.e. invalidate) the viewing key. If the key 10 has been magnetized by previous use before it is inserted, the magnetic sensing unit 23 will not activate the signal converter 14 and the guest will be unable to watch a special program until he goes to the hotel/motel office and pays for a previously viewed program. Then his viewing key will be quickly revalidated. Since it is unlikely that a guest would desire to watch more than one special program during a hotel/motel stay, this situation would not occur often. If a guest anticipates watching more than one special program during his stay, he can ask for additional viewing keys to be attached to his room key as he is checking in. He would then be billed for only the keys used.

The flowchart shown in FIG. 3 gives a more detailed picture of the operation of this system in the guest's room, using the viewing key of FIG. 2. The steps are as given below.

31. The guest wishes to view program.
32. He inserts viewing key 10 into slot of activating unit 13.
33. Does the key unlock the mechanical lock 22?
34. If "No" there is no response from the system.
35. If "Yes," the magnetic sensing unit 23 checks for magnetization (nonvalidity).
36. If "No" the sensing unit 23 attempts to magnetize the area 20 of the viewing key 10.
37. Another check for magnetization is made.
38. If still "No," a second attempt to magnetize, or repeat of steps 36 and 37, is made. (Steps 37 and 38 provide a double check of the authenticity of the viewing key. If it cannot be magnetized, viewing of the special program is not enabled).
39. If step 37 gives "Yes," the activating unit 13 enables the signal converter 14.
40. As long as the viewing key is not removed from the slot 12 of the activating unit 13, the signal converter 14 is kept enabled.
41. If the guest wishes to remove his viewing key (and room key) for some reason, a timing circuit could allow a brief grace period in which to reinsert the viewing key before the activating unit 13 would turn off.
Return to step 32.
32. If he reinserts his viewing key within the designated time period, it would, of course, activate the mechanical lock.
33. The magnetic sensing unit would check for magnetization (nonvalidity).
42. Since "Yes," the sensing unit checks to see if the timer is still on.
43. If "No," there is no further response from the system.
44. If "Yes," the activating unit 13 keeps the program on after the timer shuts off.

The timer of step 41 could obviously be adapted to also provide one brief preview of the special program without viewing key insertion.

FIGS. 4A and 4B show another embodiment wherein parts identical with those in previous figures have identical reference characters and similar or analogous parts have the same number with a prime added. The viewing key 10 has a fusible strip insert 20' to establish validity instead of the magnetizable strip 20 of FIG. 2. The mechanical lock-and-key operation 22 is unchanged, but a continuity checking device 23' takes the place of the magnetic sensing unit 23. If continuity, thus validity, is established, the unit 13 activates the signal converter 14 (as for example, by means of a relay not shown) and a current source 24' fuses the strip 20'. If continuity in the strip 20' is lacking, there is no response from the activating unit. The viewing key is again checked for continuity in the hotel/motel office at checkout time. If the strip 20' has been fused, it is removed, a new one is quickly inserted, and the guest is billed for watching a program.

The hotel/motel office shown in FIG. 5 has a sensing unit 53 of 53' similar in function to either 23 or 23', depending on the embodiment. To unit 53 or 53' is connected a revalidation unit 54 or 54', again depending on the embodiment, and a validity indicator 55 which might be any of various simple "Yes" or "No" indicators such as a small lightbulb (not shown). An apparatus 56 for rendering a billing statement could also be attached if desired.

What is claimed is:

1. In a television receiving system wherein access to certain special channels is controlled, control apparatus comprising:
    activating means including mechanical key means and a validatable portion, said portion being adapted to being cancelled; and
    enabling means including circuitry for controlling access to the special channels, locking means adapted to be unlocked by the key means, sensing means for sensing the presence of a validated portion of the activating means, and cancellation means for cancelling the validation of the validatable portion of the activating means.

2. A television receiving system according to claim 1 and further including:
    sensing means for checking the validity of the validatable portion of the activating means;
    means for indicating said validity; and
    means for revalidating said validatable portion.

3. The apparatus according to claim 1 wherein the activating means is attached to another mechanical key means.

4. The apparatus according to claim 1 wherein said validatable portion comprises magnetizable means for being demagnetized by the cancellation means.

5. The apparatus according to claim 1 wherein said validatable portion comprises demagnetizable means for being magnetized by the cancellation means.

6. The apparatus according to claim 1 wherein said validatable portion comprises a replaceable fusible means and said cancellation means includes a current source for fusing said fusible means.

7. A system for controlling access to and accounting for the use of certain special channels of a TV receiver; which channels are not regularly available, comprising:
    a. enabling means including circuitry for enabling the use of said special channels by said TV receiver and including mechanical lock means;

b. mechanical key means for unlocking said enabling means;
c. said key means including validatable means for activating said enabling circuitry;
d. said validatable means being adapted to be cancelled by said activating means;
e. sensing means for checking the validity of the validatable means;
f. means for indicating said validity; and
g. means for revalidating said validatable means; and
h. means for utilizing said key means subsequent to the enabling use thereof.

8. The system according to claim 7 wherein:
said key means is adapted to be attached to the room key of a hotel/motel room,
said validatable means includes a magnetizable portion, and
said utilizing means comprises account rendering means.

9. The system according to claim 7 wherein:
said key means is adapted to be attached to the room key of a hotel/motel room,
said validatable means comprises a demagnetizable portion, and
said utilizing means comprises account rendering means.

10. The system according to claim 7 wherein:
said key means is adapted to be attached to the room key of a hotel/motel room,
said validatable means comprises a fusible portion, and
said utilizing means comprises account rendering means.

* * * * *